(12) United States Patent
Inamura

(10) Patent No.: US 9,161,011 B2
(45) Date of Patent: Oct. 13, 2015

(54) IMAGE PROCESSING APPARATUS AND CONTROL METHOD THEREOF

(75) Inventor: Kohei Inamura, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 564 days.

(21) Appl. No.: 13/097,708

(22) Filed: Apr. 29, 2011

(65) Prior Publication Data

US 2011/0279643 A1 Nov. 17, 2011

(30) Foreign Application Priority Data

May 14, 2010 (JP) ................................. 2010-112215
Feb. 2, 2011 (JP) ................................. 2011-020733

(51) Int. Cl.
*H04N 13/00* (2006.01)
*H04N 15/00* (2006.01)

(52) U.S. Cl.
CPC ....... *H04N 13/0033* (2013.01); *H04N 13/0025* (2013.01)

(58) Field of Classification Search
USPC .............................................. 348/43, E13.06
See application file for complete search history.

(56) References Cited

U.S. PATENT DOCUMENTS

| 4,792,979 | A | * | 12/1988 | Nomura et al. ............... 382/169 |
| 6,031,543 | A | * | 2/2000 | Miyashita et al. ............ 345/593 |
| 6,163,337 | A | * | 12/2000 | Azuma et al. .................. 348/43 |
| 6,384,895 | B1 | * | 5/2002 | Sawano .......................... 355/40 |
| 7,162,074 | B2 | * | 1/2007 | Shibayama .................... 382/154 |
| 2001/0043368 | A1 | * | 11/2001 | Morikawa ...................... 358/458 |
| 2006/0055991 | A1 | * | 3/2006 | Minakuti et al. .............. 358/521 |
| 2007/0081716 | A1 | * | 4/2007 | Ha et al. ........................ 382/154 |
| 2007/0206246 | A1 | * | 9/2007 | Tsuruoka et al. ............. 358/521 |
| 2009/0284584 | A1 | * | 11/2009 | Wakabayashi et al. ......... 348/44 |
| 2009/0315881 | A1 | * | 12/2009 | Matsumoto et al. .......... 345/418 |
| 2010/0020341 | A1 | * | 1/2010 | Enjuji ............................ 358/1.9 |
| 2010/0027072 | A1 | * | 2/2010 | Enjuji .......................... 358/3.01 |
| 2010/0302355 | A1 | * | 12/2010 | Tamaru .......................... 348/59 |

FOREIGN PATENT DOCUMENTS

JP 2004-287794 10/2004

* cited by examiner

*Primary Examiner* — Christopher S Kelley
*Assistant Examiner* — Ana Picon-Feliciano
(74) *Attorney, Agent, or Firm* — Cowan, Liebowitz & Latman, P.C.

(57) ABSTRACT

An image processing apparatus that corrects gradation of a first image, which is one image from among the image for left eye and the image for right eye, and gradation of a second image, which is the other image from among the image for left eye and the image for right eye, the image processing apparatus comprises: a detection unit that detects parallax between the first image and second image; a correction unit that detects a pixel in the second image corresponding to a pixel in the first image on the basis of the parallax, and corrects a gradation value of the pixel in the first image and a gradation value of the pixel in the second image corresponding to the pixel in the first image by using a single gradation conversion curve.

12 Claims, 7 Drawing Sheets

IMAGE FOR RIGHT EYE

IMAGE FOR LEFT EYE

IMAGE PROCESSING APPARATUS AND CONTROL METHOD THEREOF

BACKGROUND OF THE INVENTION

1. Field of the Invention

The present invention relates to an image processing apparatus and a control method thereof.

2. Description of the Related Art

Image display apparatuses in which a stereoscopic video image is obtained by displaying an image for right eye and an image for left eye have become more commonplace in recent years. This has driven the need for video production compatible with stereoscopic video.

In one video production technique, contrast sensation is improved by obtaining a gradation correction curve (γ curve) according to a statistic, such as an image brightness histogram, for each frame, and by correcting pixel value gradation on the basis of the gradation correction curve (γ correction process). In another technique (local γ correction process), the γ curve is different for each pixel in the image (Japanese Patent Application Publication No. 2004-287794).

The technique disclosed in Japanese Patent Application Publication No. 2004-287794 realizes local γ correction by dividing an image into a plurality of regions and, for each pixel, combining a reference γ correction parameter, obtained at each region, on the basis of the coordinates of the pixel to be corrected.

However, in techniques such as the one disclosed in Japanese Patent Application Publication No. 2004-287794, an image is divided into a plurality of regions, and a local γ correction process that employs a γ curve obtained for each region is used, as-is, for an image for left eye and an image for right eye of a stereoscopic video image. Problems may arise thereupon on account of the particular characteristics of the stereoscopic video image. In a stereoscopic video image, specifically, a same object stands at dissimilar positions in an image for left eye and an image for right eye. When dividing an image into a plurality of regions and obtaining a γ curve for each region, specifically, a same object may belong to regions at different positions in the image for left eye and the image for right eye. In such a case, the image data in the divided region is dissimilar for the image for left eye and the image for right eye, and hence the γ curves obtained for each region are likewise dissimilar. As a result, dissimilar γ curves are used, for a same object, in the image for left eye and the image for right eye, whereupon the stereoscopic sensation is lost and flicker occurs.

SUMMARY OF THE INVENTION

The present invention provides a technique that allows configuring a local γ correction process on a stereoscopic video image, in such a manner that impairment of stereoscopic sensation and occurrence of flicker are suppressed.

A first aspect of the present invention is an image processing apparatus that, for a stereoscopic video image formed of a set of an image for left eye and an image for right eye, corrects gradation of a first image, which is one image from among the image for left eye and the image for right eye, and gradation of a second image, which is the other image from among the image for left eye and the image for right eye, the image processing apparatus comprising:

a detection unit that detects parallax between the first image and second image; and a correction unit that decides on a corresponding gradation conversion curve, for each pixel in the first image and the second image, in order to correct a gradation value of the pixel, and corrects the gradation value, wherein the correction unit detects a pixel in the second image corresponding to a pixel in the first image on the basis of the parallax, and corrects a gradation value of the pixel in the first image and a gradation value of the pixel in the second image corresponding to the pixel in the first image by using a single gradation conversion curve.

A second aspect of the present invention is a method of controlling an image processing apparatus that, for a stereoscopic video image formed of a set of an image for left eye and an image for right eye, corrects gradation of a first image, which is one image from among the image for left eye and the image for right eye, and gradation of a second image, which is the other image from among the image for left eye and the image for right eye, the method comprising:

a step of detecting parallax between the first image and second image; and a step of deciding on a corresponding gradation conversion curve, for each pixel in the first image and the second image, in order to correct a gradation value of the pixel and correcting the gradation value, wherein in the step of correcting the gradation value, a pixel in the second image corresponding to a pixel in the first image is detected on the basis of the parallax, and a gradation value of the pixel in the first image and a gradation value of the pixel in the second image corresponding to the pixel in the first image is corrected using a single gradation conversion curve.

The present allows performing a local γ correction process on a stereoscopic video image in such a manner that impairment of stereoscopic sensation and occurrence of flicker are suppressed.

Further features of the present invention will become apparent from the following description of exemplary embodiments with reference to the attached drawings.

DESCRIPTION OF THE EMBODIMENTS

<Embodiment 1>

An explanation follows next on an image processing apparatus and a control method thereof according to Embodiment 1 of the present invention. The image processing apparatus according to the present embodiment corrects gradation in a first image and a second image that make up a stereoscopic video image. An instance will be explained in which the first image is an image for left eye and the second image is an image for right eye. However, the first image may be an image for right eye and the second image may be an image for left eye. That is, either of the first image and the second image may be an image for left eye, and the other image an image for right eye. Needless to say, the first image and the second image are an image for left eye and an image for right eye for one same scene. That is, the first image and the second image are images having identical capture timing in a case where the video image is generated through capture of a stereoscopic video image. The first image and the second image can also be referred to as a set of images that make up a stereoscopic video image.

Figure 1:
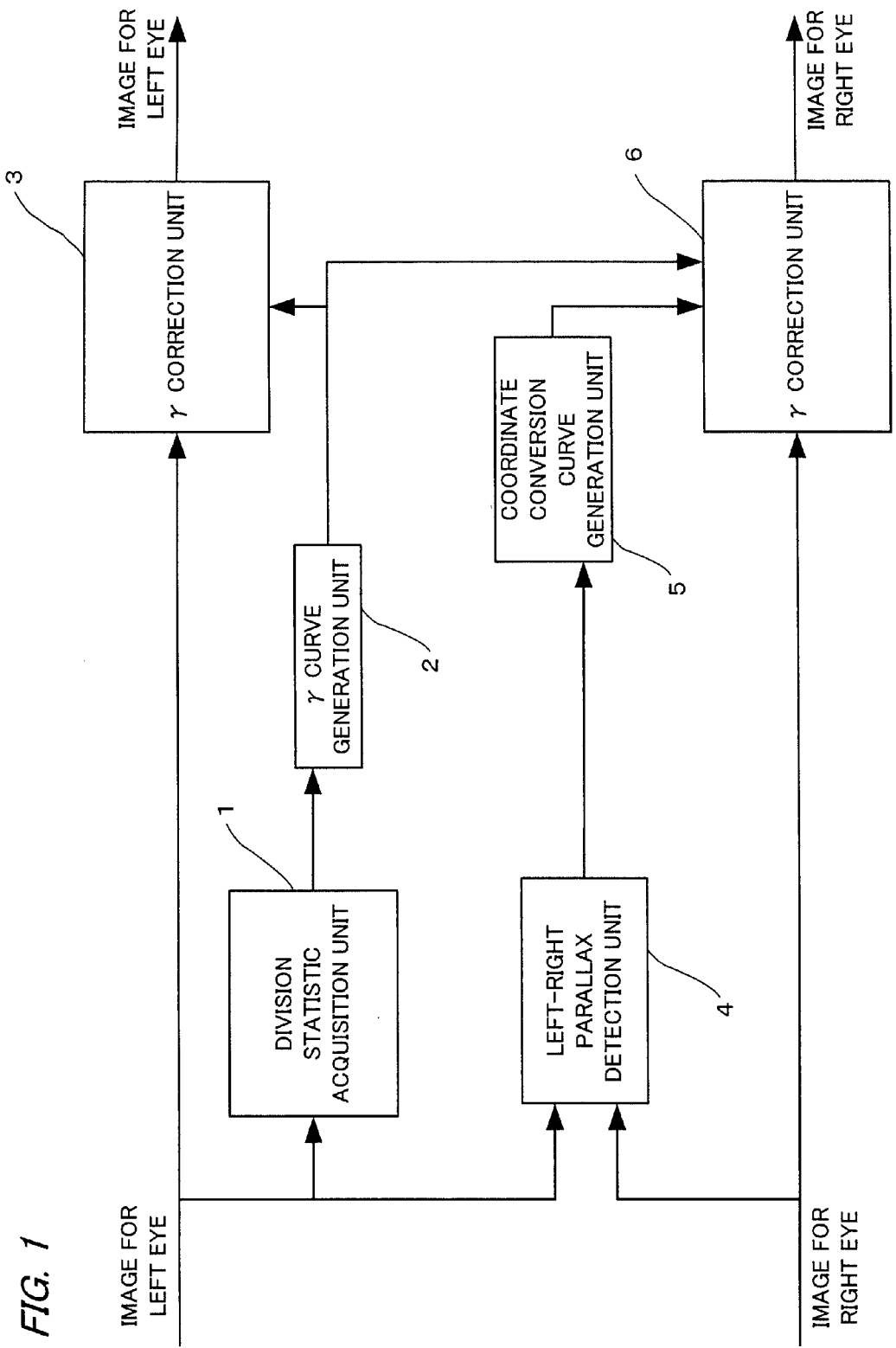
FIG. 1 is a block diagram illustrating the functional configuration of an image processing apparatus according to Embodiment 1.

FIG. 1 is a block diagram illustrating the functional configuration of an image processing apparatus according to the present embodiment.

The process flow will be explained firstly in the sequence of the block diagram. The various processes will be explained in detail further on. An input video image (signal) in the form of an image (signal) for left eye and an image (signal) for right eye is inputted to the image processing apparatus of the present embodiment. The image signal for left eye and the image signal for right eye are, for instance, brightness and color difference signals such as YCbCr or YPbPr.

A division statistic acquisition unit 1 divides an inputted image for left eye into a grid-like plurality of divided regions, and acquires a statistic of a pixel value for each divided region. In the present embodiment, a brightness histogram is acquired as the statistic.

The γ curve generation unit 2 generates (decides) gradation conversion curves (γ curves) {GL} for each divided region, on the basis of a brightness histogram of each divided region as acquired by the division statistic acquisition unit 1. In the present embodiment, a parameter within curly brackets { } represents a set of that parameter. The γ correction unit 3 decides a corresponding γ curve, for each pixel in the inputted image for left eye, and corrects (γ correction process) a gradation value (brightness signal value). That is, a gradation value is corrected while adaptively switching the γ curve that is used, for each pixel in the inputted image for left eye.

Specifically, the brightness signal is corrected, for each pixel in the inputted image for left eye, on the basis of the pixel coordinates and γ curves {GL} for each divided region as outputted by the γ curve generation unit 2. The γ correction process wherein a gradation value is corrected by switching the γ curve that is used, for each pixel, will thus be referred to as a local γ correction process.

The image for left eye and the image for right eye are inputted to a left-right parallax detection unit 4 (detection unit) that detects parallax between the image for left eye and the image for right eye. Specifically, the image for right eye is divided into a grid-like plurality of regions (blocks), a corresponding region is searched from the image for left eye, for each block, and the parallax between the image for left eye and the image for right eye is worked out.

A coordinate conversion curve generation unit 5 generates coordinate conversion curves {TL} using a process wherein mutually corresponding pixels of the image for left eye and pixels of the image for right eye are detected on the basis of the parallax between the image for left eye and the image for right eye as outputted by the left-right parallax detection unit 4.

A γ correction unit 6 decides a corresponding γ curve, and corrects the gradation value, for each pixel of the inputted image for right eye. For each pixel in the image for right eye, specifically, the γ correction unit 6 detects a pixel in the image for left eye that corresponds to the foregoing pixel, using the coordinate conversion curves {TL} from the coordinate conversion curve generation unit 5. The γ correction unit 6 corrects the brightness signal on the basis of that detection result and the γ curves {GL} from the γ curve generation unit 2.

In the present embodiment, the division statistic acquisition unit 1, the γ curve generation unit 2, the γ correction unit 3, the coordinate conversion curve generation unit 5 and the γ correction unit 6 correspond to a correction unit.

Processes for each function are explained next in detail.

Figure 2:
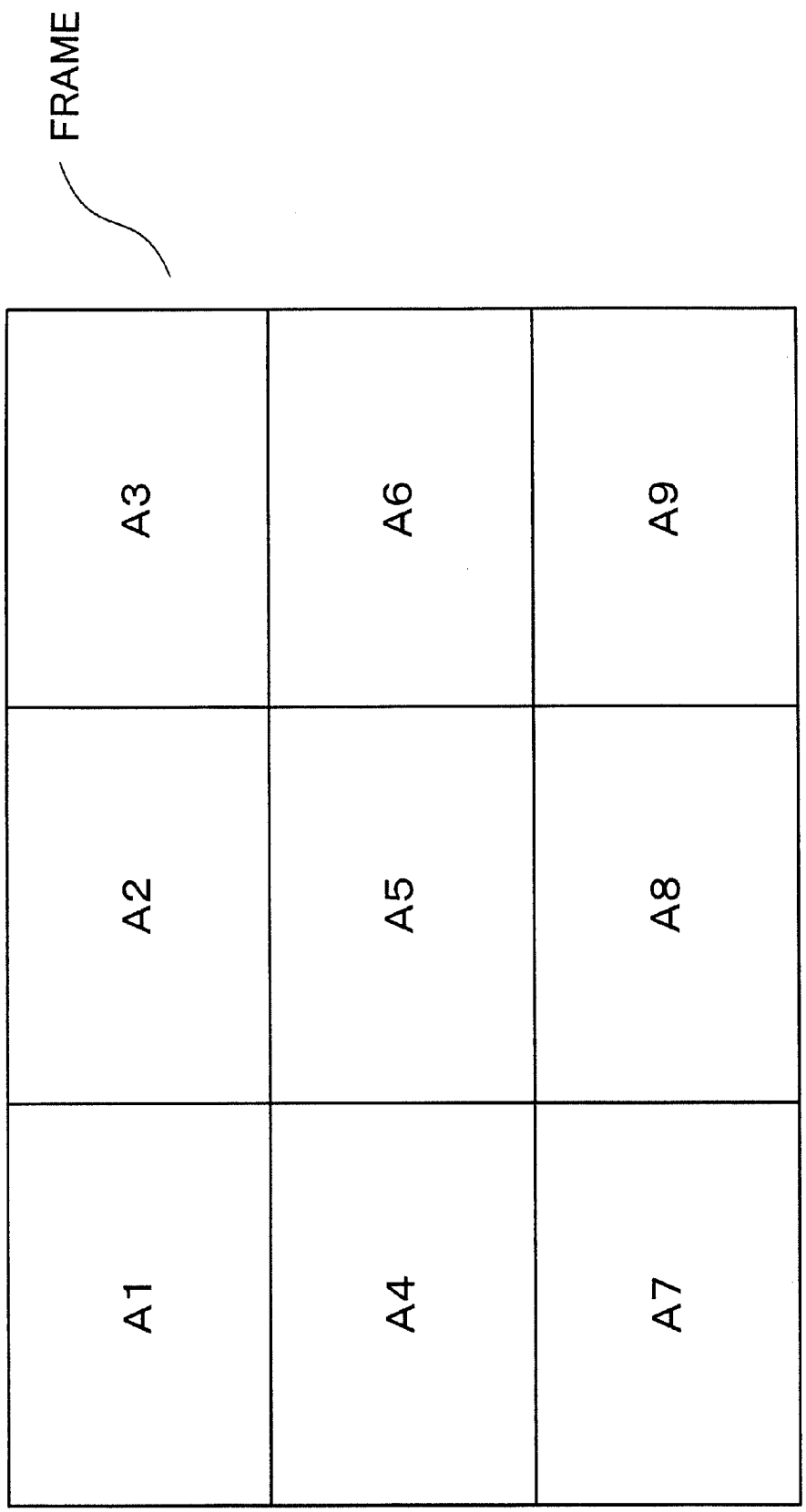
FIG. 2 is a diagram illustrating an example of a divided region.

As illustrated in FIG. 2, the division statistic acquisition unit 1 divides an image for left eye into a grid-like plurality of divided regions A1 to A9, and acquires a brightness histogram for each divided region. In the present embodiment, the image for left eye is divided into nine divided regions, but the number of divided region is not limited thereto. The brightness histogram is created by counting the number of occurrences of each gradation value in a Y signal that represents brightness in the inputted image for left eye.

The γ curve generation unit 2 generates a γ curve, for each divided region, on the basis of the brightness histogram for each divided region as outputted by the division statistic acquisition unit 1.

Various methods have been proposed for obtaining a γ curve from a brightness histogram. In the present embodiment, there is obtained a cumulative brightness histogram on the basis of brightness histograms, and the frequency of the cumulative brightness histogram is normalized by the number of gradations in the image data (Y signal), to generate thereby a γ curve.

The gradation of an image having a gradation range of high frequency in the brightness histogram is increased, while the gradation of an image having a gradation range of low frequency is reduced, by using the γ curve thus created. In the brightness histogram, in other words, more gradation values are allotted to a gradation range having a high frequency, while a gradation range having a low frequency is compressed. Contrast in the image can be improved thereby.

In the present embodiment, an example is explained in which the γ curve is created on the basis of a brightness histogram, but the γ curve may also be generated using another statistic. For instance, an average picture level (APL) of the image may be acquired as the statistic, a γ curve may be generated that increases the gradation of an image at high-gradation portions, in a high-APL image, and a further γ curve may be generated that increases the gradation of an image at low-gradation portions, in a low-APL image.

Figure 3:
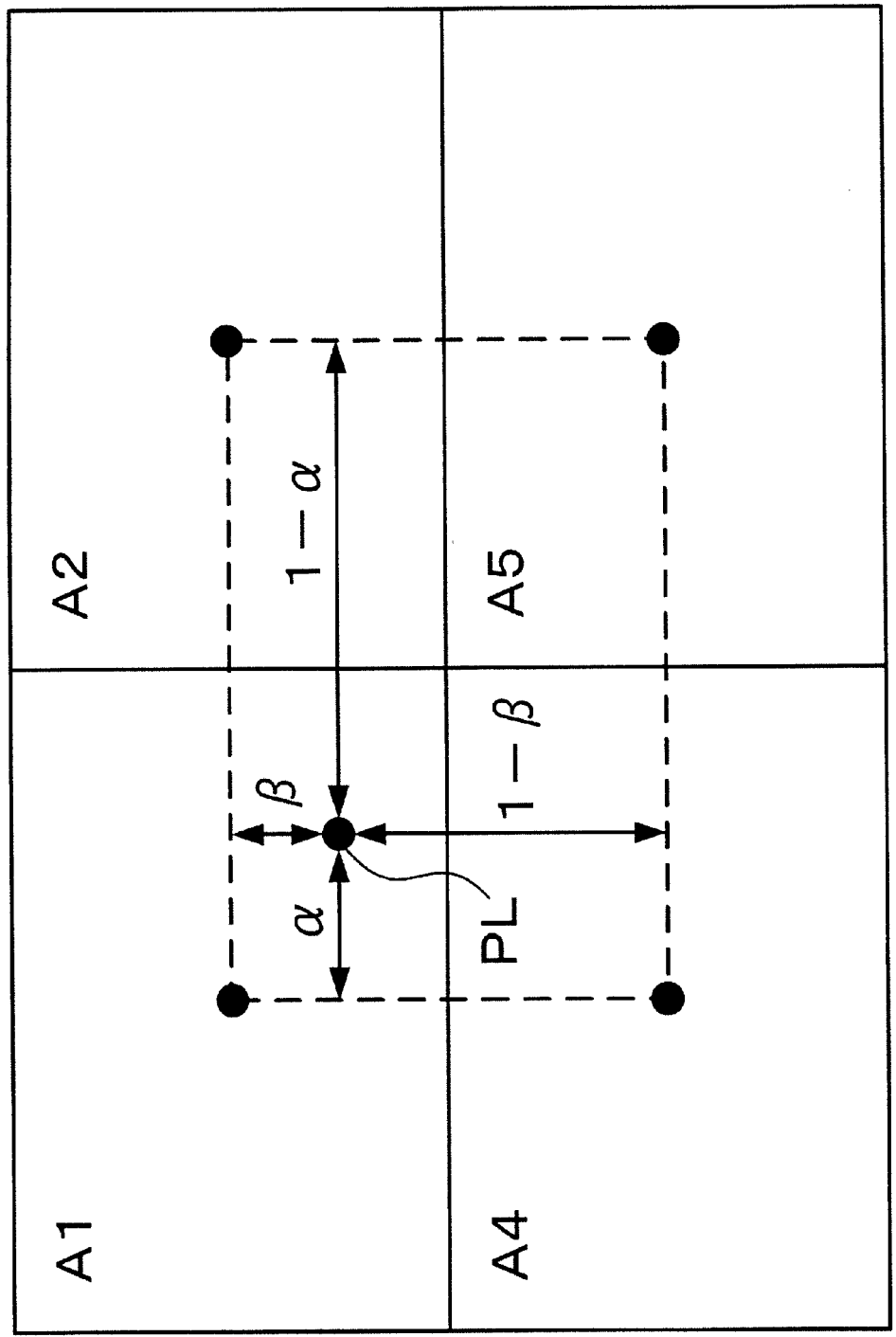
FIG. 3 is a diagram illustrating an example of a calculation method of a γ correction value.

The γ correction unit 3 decides a γ curve that is used in the pixels of each divided region in the image for left eye, on the basis of the acquired statistic. Specifically, a γ curve for each pixel in the image for left eye is decided using the γ curve for each divided region as generated on the basis of the statistic of each divided region. The gradation value is then corrected, for pixels in the image for left eye, using the γ curves decided for those pixels. The γ curves for the divided regions A1, A2, A4, A5 are γ curves γ1, γ2, γ4, γ5, respectively. The γ correction unit 3 uses the γ curves γ1, γ2, γ4, γ5 as the γ curve of a pixel PL in a case where the coordinates of a pixel PL are present within a rectangular region resulting from joining the center coordinates of the divided regions A1, A2, A4, A5 of FIG. 2. Next, the γ correction unit 3 corrects the gradation value P of the pixel PL using the γ curves γ1, γ2, γ4, γ5, and calculates the gradation values OP1, OP2, OP4, OP5. The γ correction unit 3 calculates the γ correction value of the pixel PL (gradation value after final correction) by combining the four gradation values OP1, OP2, OP4, OP5 on the basis of the coordinates of the pixel PL. For instance, the ratio between the distance from the center of the divided regions A1, A4 up to the pixel PL, and the distance from the pixel PL to the center of the divided regions A2, A5, in the horizontal direction, is =α:1-α, as illustrated in FIG. 3. Similarly, the ratio between the distance from the center of the divided regions A1, A2 up to the pixel PL, and the distance from the pixel PL to the center of the divided regions A4, A5, in the vertical direction, is =β:1-β. In this case, the γ correction value OP of the pixel PL is calculated according to formula 1 below.

$$OP=(1-\beta)\times((1-\alpha)\times OP1+\alpha\times OP2)+\beta\times((1-\alpha)\times OP4+\alpha P5) \quad \text{(formula 1)}$$

The above-described process is equivalent to a process that calculating one γ curve by combining a plurality of γ curves, for each pixel, and correcting the gradation value of a pixel using the calculated γ curve.

A γ correction value for each pixel in the image for left eye is obtained by executing the above-described process for each pixel in the image for left eye.

The left-right parallax detection unit 4 detects, from the image for left eye, a position (corresponding position) that corresponds to the position of the image for right eye. Parallax is acquired in the form of the difference (vector quantity) between the position in the image for right eye and a position corresponding to the position in the image for right eye. In the present embodiment, the corresponding position is detected by block matching method.

That is, the image for right eye is divided into a grid-like plurality of blocks (block division). For each block, a region is searched that has the highest correlation with the block (region having the same size as the block), from the image for left eye, and the region position is taken as the corresponding position.

Figure 4:
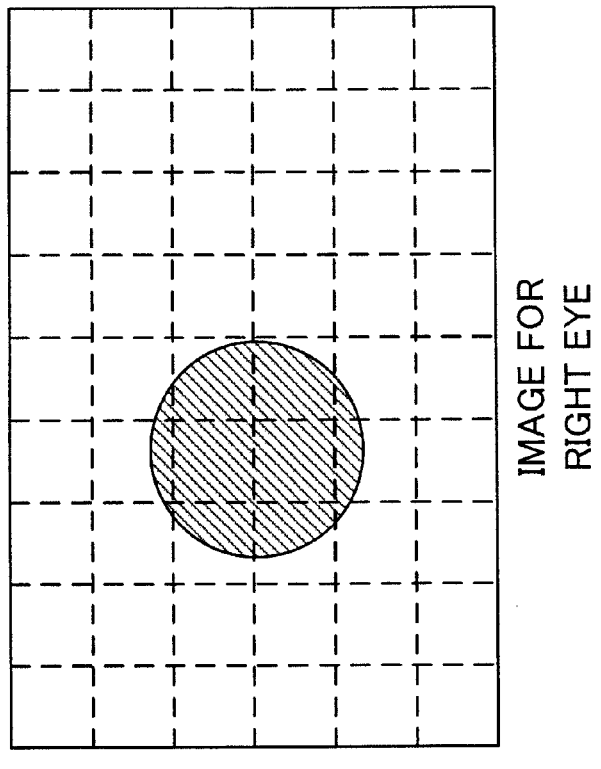
FIG. 4 is a diagram illustrating an example of block division.
Figure 4:
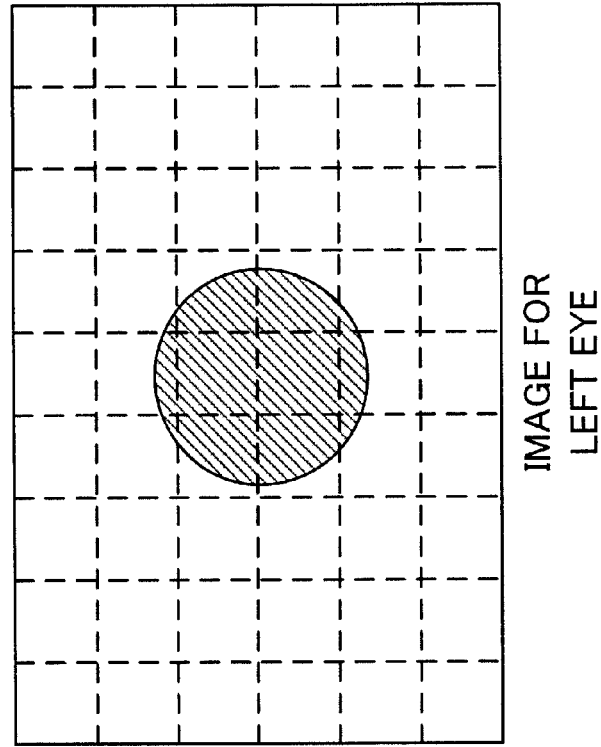

Block division is illustrated in FIG. 4. In the present embodiment, one image is divided into 54 blocks. Specifically, the image is divided into nine blocks in the horizontal direction and six blocks in the vertical direction.

The left-right parallax detection unit 4 detects a corresponding position by shifting the search position, within the image for left eye, in the horizontal direction, with respect to the position of the block in the image for right eye. Specifically, a corresponding position is detected by moving a search position within a range [x−w, x+w] in the horizontal direction, wherein x is the coordinate, in the horizontal direction, of the block of the image for right eye (and w is a predefined value). The search position is moved in the horizontal direction alone, since there is virtually no offset of the image for left eye and of the image for right eye in the vertical direction. In the present embodiment, a sum of absolute differences (SAD) is used as a correlation value. Specifically, an absolute value of a pixel value difference is calculated for each position corresponding to two regions (block region and region denoted by the search position), and the summation value of the foregoing is the correlation value. The higher the correlation between the two regions, the smaller the SAD value becomes. Therefore, the parallax is the difference between the positions of the block and the search position at which SAD is minimal. For instance, if SAD is minimum at a position x+d in the image for left eye, then d is taken as the parallax. In a case where the minimum-SAD value exceeds a predefined threshold value, however, it is determined that there is no corresponding position (no parallax can be detected), and "no parallax" is determined.

The information on parallax (parallax information) that is outputted by the left-right parallax detection unit 4 is information for each block in one image.

On the basis of the above-described parallax information, the coordinate conversion curve generation unit 5 creates a coordinate conversion curve for each row of blocks (hereafter referred to as block line) having an identical vertical direction position. The coordinate conversion curve is a function such that a value resulting from adding parallax to the input of the coordinate of a pixel in the image for right eye is outputted as a coordinate of the pixel in the image for left eye. Specifically, the coordinate conversion curve is generated by adding the parallax to a coordinate in the image for right eye. The coordinate conversion curve is generated in such a manner that there occurs no jump (level difference, shift) in the coordinates (output value) outputted between neighboring blocks (adjacent blocks), in a case where disparities between adjacent blocks are dissimilar, and/or in a case where the blocks have no parallax.

The coordinate conversion curve is specifically generated as follows.

Firstly, if there is parallax for each block in one block line, a coordinate conversion curve is generated, and outputted, in which parallax is added to the input of the coordinates of the pixel in the block.

Next, the output values are compared with respect to the input of the coordinates at the boundary between adjacent blocks. In case of jumps between the output values, the coordinate conversion curve is rewritten in such a manner that the center points of the coordinate conversion curve of the adjacent blocks (values of the coordinate conversion curve with respect to an intermediate value of the inputted coordinates) are joined by a straight line.

In blocks for which there is no parallax, the coordinate conversion curve is generated in such a manner so as to join, for instance with a straight line, the end points of the coordinate conversion curves at the left and right of the block.

A specific example of the above procedure is explained next.

Figure 5:
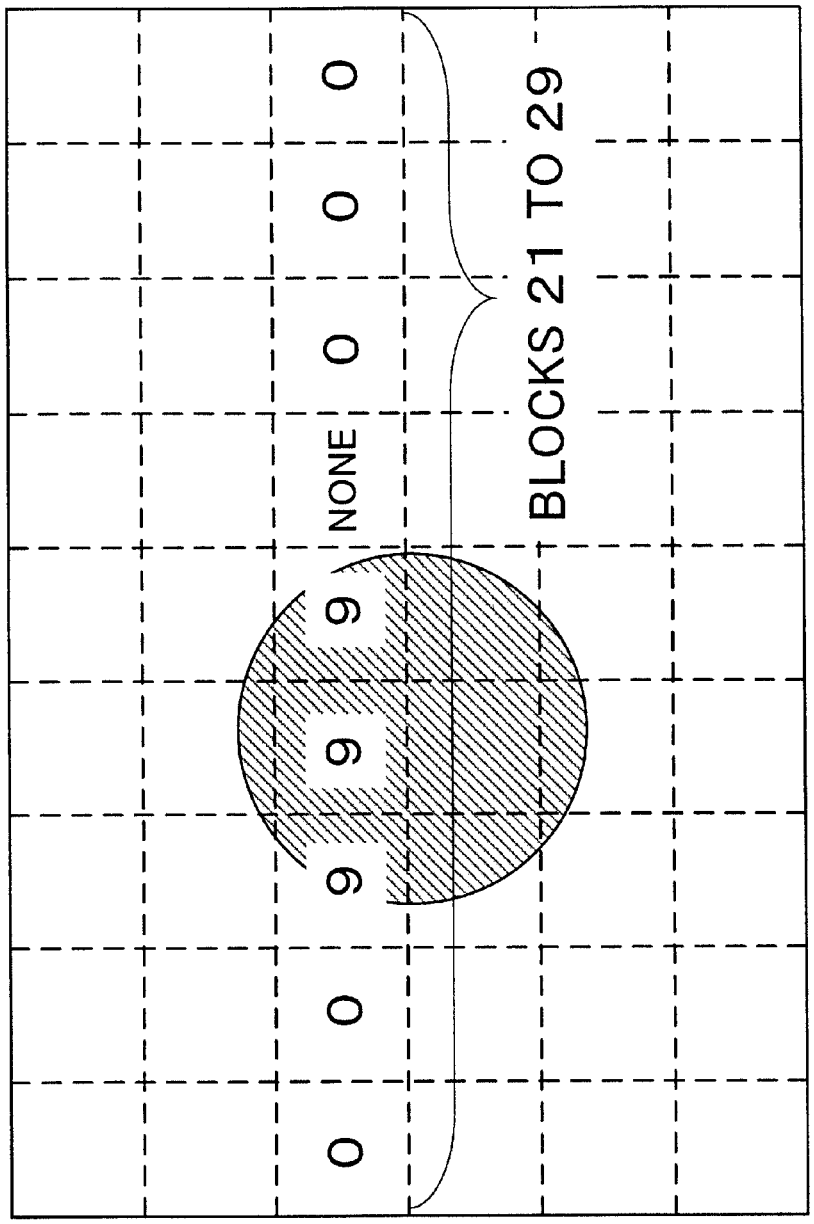
FIG. 5 is a diagram illustrating an example of a parallax detection result.

Parallax such as the one illustrated in FIG. 5 is detected upon block matching using an image for left eye and an image for right eye illustrated in FIG. 4. In FIG. 5, the parallax of blocks 21 to 29 on a third block line c from the top is denoted at the position of each block in the image for right eye. The parallax in the blocks on other block lines a, b, d, e, f is omitted. An example will be described next on the creation of a coordinate conversion curve of the block line c.

Figure 6A:
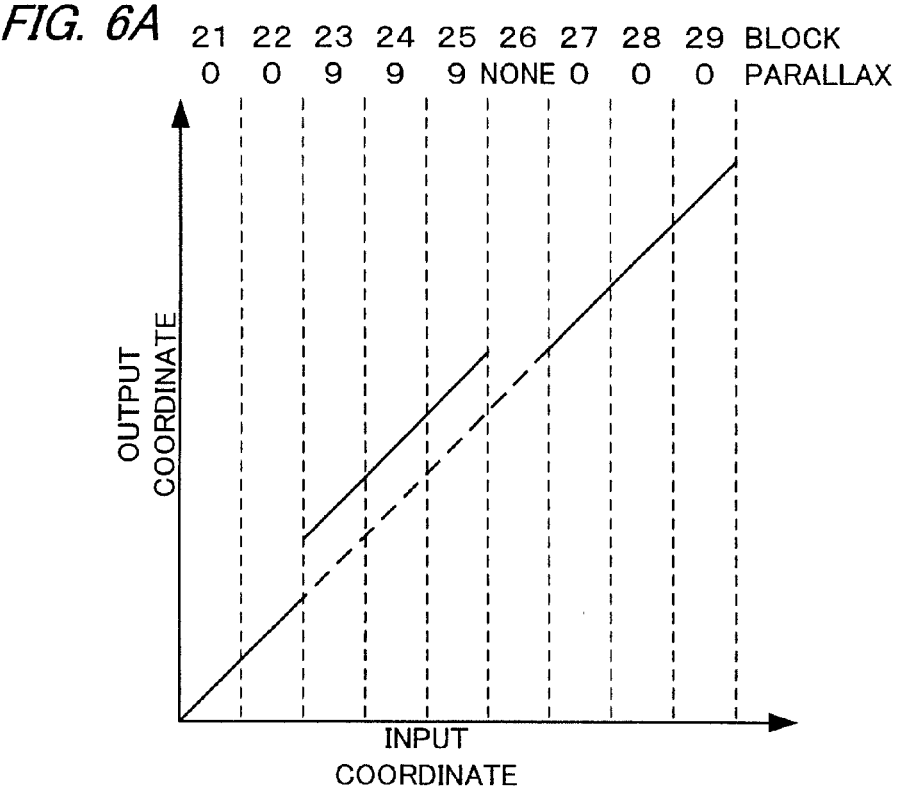
FIGS. 6A, 6B are diagrams illustrating examples of coordinate conversion curves.

The coordinate conversion curve created on the basis of the obtained parallax looks as in FIG. 6A. Specifically, the parallax of block 22 is 0, and the parallax of block 23 is 9. Therefore, there is a jump in the output value between block 22 and block 23. Block 26 has no parallax, and hence no coordinate conversion curve is generated at this point in time.

Figure 6B:
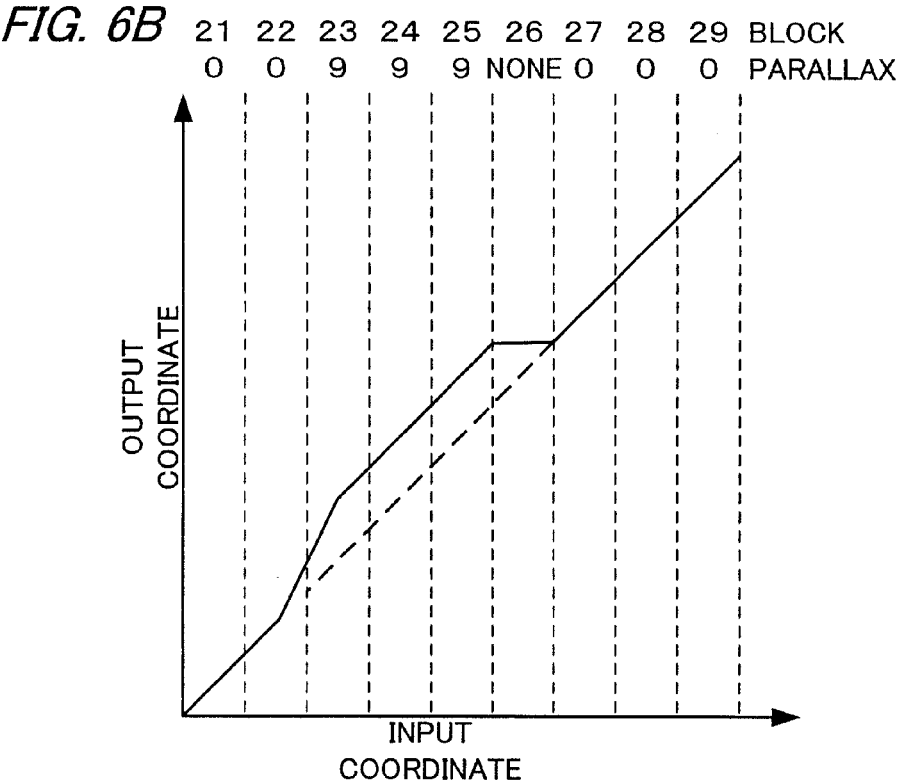

The coordinate conversion curve is adjusted in such a way so as join the center points of the coordinate conversion curves of block 22 and block 23. For block 26 there is generated a coordinate conversion curve at blocks 25, 27 to the left and right. Therefore, a coordinate conversion curve is generated so as to join the end points of the coordinate conversion curves of the foregoing blocks. Specifically, the coordinate conversion curve looks eventually as in FIG. 6B. Parallax is virtually set also for block 26, which lacks parallax, through generation of a coordinate conversion curve, as illustrated in FIG. 6B. For instance, the parallax at the left end portion of block 26 is 9, the parallax at the central portion is 4.5, and the parallax at the right end portion is 0.

The coordinate conversion curve generation unit 5 performs all the above-described processes on the block line, and generates, and outputs, coordinate conversion curves {TL} for each block line.

For each pixel of the inputted image for right eye, the γ correction unit 6 detects a pixel in the image for left eye that corresponds to the foregoing pixel, by using the coordinate conversion curves {TL} from the coordinate conversion curve generation unit 5. Those pixels of the image for left eye corresponding to the pixels in the image for right eye that lack parallax become pixels of the image for left eye that are detected on the basis of the virtual parallax derived from the coordinate conversion curves. The γ correction values are calculated on the basis of the above detection result and the γ curves {GL} from the γ curve generation unit 2. Specifically, a γ correction value is calculated, for a pixel in the image for right eye, using a γ curve decided for a pixel in the image for left eye that corresponds to the pixel in the image for right eye.

For instance, taking x as the horizontal direction coordinate and y as the vertical direction coordinate of a pixel PR in the image for right eye, there is determined at which block line a pixel PR stands, on the basis of the y value. Next, there is detected a coordinate (horizontal direction coordinate x', vertical direction coordinate y) in the image for left eye of the pixel PR, using a coordinate conversion curve TL of the corresponding block line, i.e. there is detected a pixel in the image for left eye that corresponds to the pixel PR.

The γ correction value is calculated as a result of a process identical to that of the γ correction unit 3 based on the detected coordinate (x', y) (by using the same γ curve, and with the same weighting, as in the case of correction of the gradation value of the pixel in the image for left eye having the coordinate (x', y)).

In the present embodiment, as described above, a pixel in the first image and a pixel in the second image corresponding to each other are detected on the basis of parallax, and the gradation value of a pixel in the first image and a pixel in the second image corresponding to each other is corrected using a same gradation conversion curve. Specifically, the gradation value of a pixel in the first image is corrected using a gradation conversion curve decided for that pixel. The gradation value of a pixel in the second image is corrected using the gradation conversion curve decided for the pixel in the first image to which the pixel in the second image corresponds. A stereoscopic video image can be subjected thereby to a local γ correction process in which occurrence of flicker and loss of stereoscopic sensation are suppressed.

In the present embodiment an instance is explained in which the video image signal is a brightness/color difference signal, but an RGB signal may be used as the video image signal, such that a brightness histogram is created by extracting a value corresponding to brightness, from the RGB signal, and there are generated γ curves that are used for each RGB signal.

<Embodiment 2>

An explanation follows next on an image processing apparatus and a control method thereof according to Embodiment 2 of the present invention.

Figure 7:
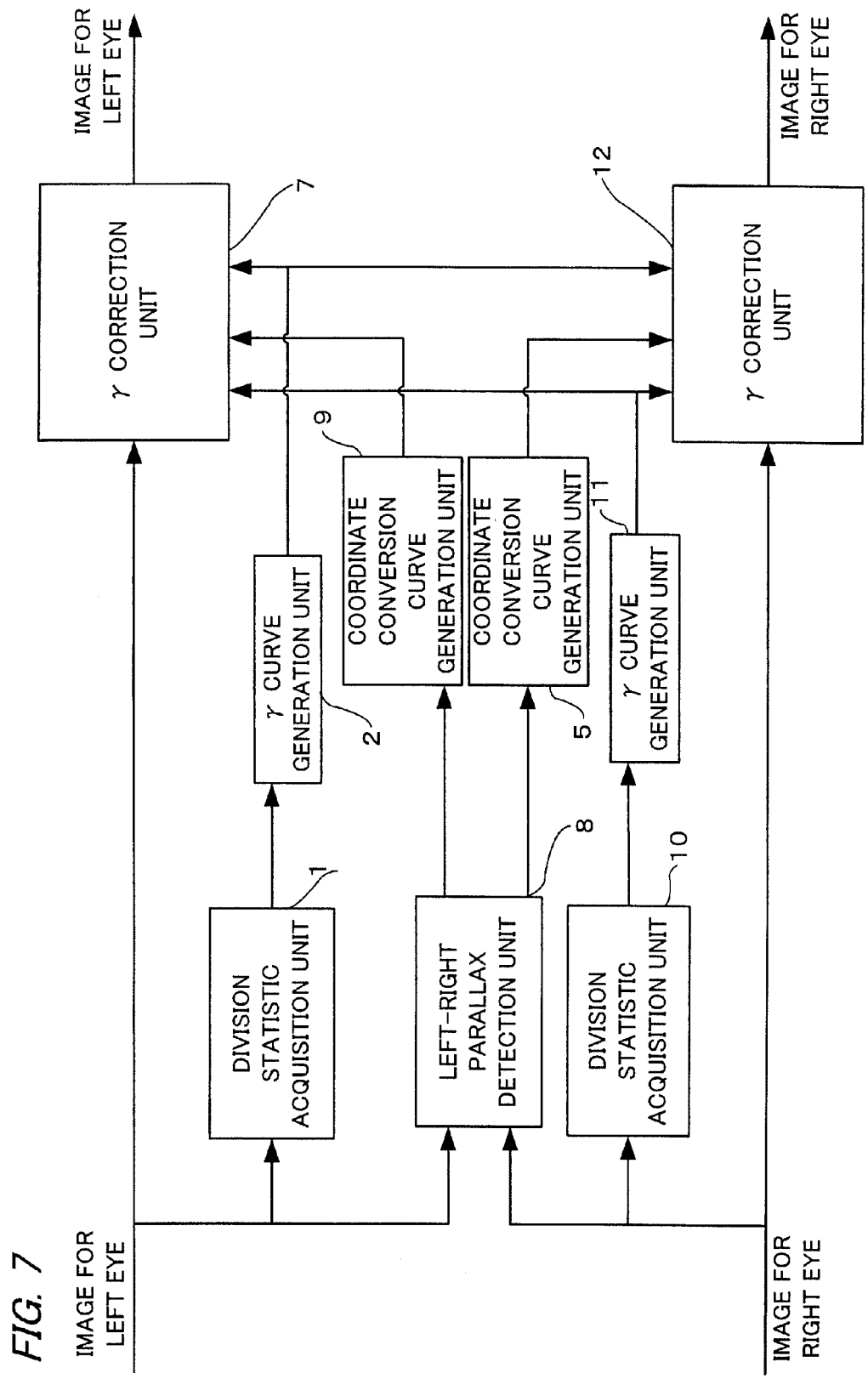
FIG. 7 is a block diagram illustrating the functional configuration of an image processing apparatus according to Embodiment 2.

FIG. 7 is a block diagram illustrating the functional configuration of an image processing apparatus according to the present embodiment. In the image processing apparatus according to the present embodiment, there is acquired a statistic for each divided region also from the image for right eye, and the gradation value is corrected on the basis of the statistics of both the image for left eye and the image for right eye.

The process flow will be explained firstly in the sequence of the block diagram. The various processes will be explained in detail further on.

The operation of the division statistic acquisition unit 1 and the γ curve generation unit 2 are identical to those of Embodiment 1.

The γ curve generation unit 2 generates and outputs γ curves {GL} of each divided region of the image for left eye.

Unlike the γ correction unit 3 of Embodiment 1, a γ correction unit 7 receives the input of γ curves {GL} for the image for left eye, γ curves {GR} outputted by a γ curve generation unit 11, for the image for right eye, and coordinate conversion curves {TR} outputted by a coordinate conversion curve generation unit 9. The γ correction unit 7 performs a γ correction process for each pixel in the image for left eye. Unlike the γ correction unit 3 of Embodiment 1, specifically, the γ correction unit 7 decides a final γ correction value by combining a first gradation value corrected on the basis of the γ curves {GL}, and a second gradation value corrected on the basis of the γ curves {GR}, for each pixel of in the image for left eye. For a pixel in the image for left eye, more specifically, the γ correction unit 7 calculates a first gradation value by correcting the gradation value of the pixel using the γ curve decided for that pixel in the image for left eye. The γ correction unit 7 calculates a second gradation value by correcting a gradation value using the γ curve decided for the pixel in the image for right eye and that corresponds to the pixel in the image for left eye. The γ correction unit 7 calculates a final gradation value (γ correction value) by combining the first gradation value and the second gradation value.

A left-right parallax detection unit 8 detects parallax between the image for left eye and the image for right eye, according to the same method as in Embodiment 1. In the present embodiment, however, there is detected not only parallax referred to the image for right eye (specifically, position of a block in the image for right eye), but also parallax referred to the image for left eye (specifically, position of a block in the image for left eye). Parallax referred to the image for right eye is outputted to the coordinate conversion curve generation unit 5, and parallax referred to the image for left eye is outputted to the coordinate conversion curve generation unit 9.

The coordinate conversion curve generation unit 5, as well as Embodiment 1, generates coordinate conversion curves {TL} that are used in the process of detecting a pixel in the image for left eye corresponding to the a pixel in the image for right eye, and outputs the generated coordinate conversion curves {TL} to a γ correction unit 12. The coordinate conversion curve generation unit 9 generates coordinate conversion curves {TR} that are used in a process of detecting a pixel in the image for right eye corresponding to a pixel in the image for left eye, according to the same process as in the coordinate conversion curve generation unit 5, and outputs the generated coordinate conversion curves {TR} to the γ correction unit 7.

A division statistic acquisition unit 10 acquires a brightness histogram of each divided region in the image for right eye through the same process as in the division statistic acquisition unit 1.

A γ curve generation unit 11 generates γ curves {GR} for each divided region in the image for right eye through the same process as in the γ curve generation unit 2, using the brightness histogram for each divided region as acquired by the division statistic acquisition unit 10.

The γ correction unit 12 receives the input of the γ curves {GR} for the image for right eye, the γ curves {GL} for the image for left eye and the coordinate conversion curves {TL}. The γ correction unit 12 performs a γ correction process for each pixel in the image for right eye. Specifically, the γ correction unit 12 decides a final γ correction value, for each pixel in the image for right eye, by combining a third gradation value corrected on the basis of the γ curves {GR} and a fourth gradation value corrected on the basis of the γ curves {GL}. More specifically, the γ correction unit 12 calculates, for a pixel in the image for right eye, the third gradation value by correcting the gradation value of the pixel using a γ curve decided for the pixel in the image for right eye. The γ correction unit 12 calculates a fourth gradation value by correcting a gradation value using a γ curve decided for the pixel in the image for left eye and that corresponds to the pixel in the image for right eye. The γ correction unit 12 calculates a final gradation value (γ correction value) by combining the third gradation value and the fourth gradation value.

In the present embodiment, the division statistic acquisition units 1, 10, the γ curve generation units 2, 11, the coordinate conversion curve generation units 5, 9, and the γ correction units 7, 12, correspond to a correction unit.

An explanation follows next on a combining method of the first gradation value and the second gradation value in the γ correction unit 7.

The γ curves {GL} outputted by the γ curve generation unit 2 are the same as the γ curves {GL} explained in Embodiment 1, i.e. are a set of γ curves decided, for each divided region in the image for left eye, on the basis of a statistic of that divided region.

The γ correction unit 7 corrects a gradation value of each pixel in the image for left eye, through the same process as the process by the γ correction unit 3 of Embodiment 1. Specifically, the γ correction unit 7 corrects, for each pixel in the image for left eye, a gradation value on the basis of the γ curves {GL} and the coordinate of the pixel. A first gradation value is obtained as a result of the correction.

The γ curves {GR} outputted by the γ curve generation unit 11 are a set of γ curves decided, for each divided region in the image for right eye, on the basis of a statistic of that divided region.

The coordinate conversion curves {TR} outputted by the coordinate conversion curve generation unit 9 are conversion curves that are used in the process of detecting a pixel in the image for right eye that corresponds to a pixel in the image for left eye.

The γ correction unit 7 corrects a gradation value of each pixel in the image for left eye, through the same process as the process by the γ correction unit 6 of Embodiment 1. Specifically, the γ correction unit 7 detects, for each pixel in the image for left eye, a pixel in the image for right eye corresponding to the pixel, using the coordinate conversion curves {TR}, and corrects the gradation value on the basis of the detection result and the γ curves {GR}. A second gradation value is obtained as a result of the correction.

In the present embodiment, the γ correction unit 7 calculates, for each pixel in the image for left eye, a final γ correction value for that pixel in the form of the mean value of the first gradation value and the second gradation value.

A detailed explanation follows next on a method of combining the third gradation value and the fourth gradation value in the γ correction unit 12.

The γ correction unit 12 corrects a gradation value of each pixel in the image for right eye, through the same process as the process by the γ correction unit 3 of Embodiment 1. Specifically, the γ correction unit 12 corrects, for each pixel in the image for right eye, a gradation value on the basis of the γ curves {GR} and the coordinate of the pixel. A third gradation value is obtained as a result of the correction.

The coordinate conversion curves {TL} outputted by the coordinate conversion curve generation unit 5 are conversion curves that are used in the process of detecting a pixel in the image for left eye that corresponds to a pixel in the image for right eye.

The γ correction unit 12 corrects a gradation value of each pixel in the image for right eye, through the same process as the process by the γ correction unit 6 of Embodiment 1. Specifically, the γ correction unit 12 detects, for each pixel in the image for right eye, a pixel in the image for left eye corresponding to the pixel, using the coordinate conversion curves {TL}, and corrects the gradation value on the basis of the detection result and the γ curves {GL}. A fourth gradation value is obtained as a result of the correction.

In the present embodiment, the γ correction unit 12 calculates, for each pixel in the image for right eye, a final γ correction value for that pixel in the form of the mean value of the third gradation value and the fourth gradation value. Herein, a pixel in the image for left eye corresponding to a pixel within a region of the image for right eye in which parallax is absent (cannot be detected) is a pixel detected on the basis of a virtual parallax derived from a coordinate conversion curve generated as in FIG. 6B of Embodiment 1. For a pixel in a region of the image for right eye in which parallax cannot be detected there may be set, as a final gradation value of that pixel, a gradation value corrected on the basis of the γ curves {GR} (i.e. the third gradation value). In the image for left eye, likewise, the first gradation value may be set, as the final gradation value, for a pixel in a region where parallax cannot be detected.

In the present embodiment, as described above, pixels of the first image and pixels of the second image corresponding to each other are detected on the basis of parallax, and the gradation values of mutually corresponding pixels of the first image and pixels of the second image are corrected using a same gradation conversion curve. Specifically, a final γ correction value is decided, for each pixel in the first image and the second image, by combining a gradation value corrected on the basis of the γ curves {GL}, and a gradation value corrected on the basis of the γ curves {GP}. Thereby, a stereoscopic video image can be subjected to a local γ correction process in which flicker and loss of stereoscopic sensation are suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-112215, filed on May 14, 2010, and Japanese Patent Application No. 2011-020733, filed on Feb. 2, 2011, which are hereby incorporated by reference herein in their entirety.

What is claimed is:

1. An image processing apparatus that, for a stereoscopic video image formed of a set of an image for left eye and an image for right eye, corrects gradation of a first image, which is one image from among the image for left eye and the image for right eye, and gradation of a second image, which is the other image from among the image for left eye and the image for right eye, the image processing apparatus comprising:

a detection unit configured to detect parallax between the first image and second image;

an acquisition unit configured to divide at least one image from among the first image and the second image into a plurality of divided regions, and acquire a respective statistic of a pixel value for each divided region;

a decision unit configured to decide a respective gradation conversion curve for each divided region by using the statistic corresponding to the respective divided region acquired by the acquisition unit, and to decide a respective gradation conversion curve for each pixel on the basis of at least a respective gradation conversion curve corresponding to a divided region in which the pixel is located; and a correction unit configured to correct the gradation value of each pixel in the first image by using the respective gradation conversion curve corresponding to the pixel decided by the decision unit and to correct the gradation value of each pixel in the second image, wherein the correction unit detects a pixel in the second image corresponding to a pixel in the first image on the basis of the parallax, and corrects a gradation value of the pixel in the first image and a gradation value of the pixel in the second image corresponding to the pixel in the first image by using a gradation conversion curve based on the respective gradation conversion curve which the decision unit decided for the pixel in the first image.

2. The image processing apparatus according to claim 1, wherein the correction unit corrects a gradation value of a pixel in the first image by using a gradation conversion curve which is decided for the pixel using a statistic obtained from the first image, and corrects a gradation value of a pixel in the second image by using a gradation conversion curve which is decided for a pixel in the first image corresponding to the pixel in the second image using a statistic obtained from the first image.

3. The image processing apparatus according to claim 1, wherein the correction unit calculates a first gradation value by correcting a gradation value of a pixel in the first image by using a gradation conversion curve which is decided for the pixel in the first image using a statistic obtained from the first image, calculates a second gradation value by correcting the gradation value of the pixel in the first image by using a gradation conversion curve which is decided for a pixel in the second image corresponding to the pixel in the first image using a statistic obtained from the second image, and calculates a final gradation value of the pixel in the first image by combining the first gradation value and the second gradation value; and calculates a third gradation value by correcting a gradation value of a pixel in the second image by using a gradation conversion curve which is decided for the pixel in the second image using a statistic obtained from the second image;

calculates a fourth gradation value by correcting the gradation value of the pixel in the second image by using a gradation conversion curve which is decided for a pixel in the first image corresponding to the pixel in the second image using a statistic obtained from the first image, and calculates a final gradation value of the pixel in the second image by combining the third gradation value and the fourth gradation value.

4. The image processing apparatus according to claim 3, wherein the correction unit sets the first gradation value as a final gradation value for a pixel in a region of the first image at which parallax cannot be detected by the detection unit; and sets the third gradation value as a final gradation value for a pixel in a region of the second image at which parallax cannot be detected by the detection unit.

5. A method of controlling an image processing apparatus that, for a stereoscopic video image formed of a set of an image for left eye and an image for right eye, corrects gradation of a first image, which is one image from among the image for left eye and the image for right eye, and gradation of a second image, which is the other image from among the image for left eye and the image for right eye, the method comprising:

a step of detecting parallax between the first image and second image;

a step of dividing at least one image from among the first image and the second image into a plurality of divided regions, and acquiring a respective statistic of a pixel value for each divided region;

a step of deciding a respective gradation conversion curve for each divided region by using the statistic corresponding to the respective divided region acquired in the step of acquiring the statistic of the pixel value, and of deciding a respective gradation conversion curve for each pixel on the basis of at least a respective gradation conversion curve corresponding to a divided region in which the pixel is located; and a step of correcting the gradation value of each pixel in the first image by using the respective gradation conversion curve corresponding to the pixel decided in the step of deciding the gradation conversion curve for each pixel, and of correcting the gradation value of each of pixels in the second image, wherein in the step of correcting the gradation value, a pixel in the second image corresponding to a pixel in the first image is detected on the basis of the parallax, and a gradation value of the pixel in the first image and a gradation value of the pixel in the second image corresponding to the pixel in the first image is corrected using a gradation conversion curve based on the respective gradation conversion curve which is decided for the pixel in the first image in the step of deciding.

6. The method of controlling an image processing apparatus according to claim 5, wherein in the step of correcting the gradation value, a gradation value of a pixel in the first image is corrected by using a gradation conversion curve which is decided for the pixel using a statistic obtained from the first image, and a gradation value of a pixel in the second image is corrected by using a gradation conversion curve which is decided for a pixel in the first image corresponding to the pixel in the second image using a statistic obtained from the first image.

7. The method of controlling an image processing apparatus according to claim 5, wherein in the step of correcting the gradation value, a first gradation value is calculated by correcting a gradation value of a pixel in the first image by using a gradation conversion curve which is decided for the pixel in the first image using a statistic obtained from the first image, a second gradation value is calculated by correcting the gradation value of the pixel in the first image by using a gradation conversion curve which is decided for a pixel in the second image corresponding to the pixel in the first image using a statistic obtained from the second image, and a final gradation value of the pixel in the first image is calculated by combining the first gradation value and the second gradation value; and a third gradation value is calculated by correcting a gradation value of a pixel in the second image by using a gradation conversion curve which is decided for the pixel in the second image using a statistic obtained from the second image;

a fourth gradation value is calculated by correcting the gradation value of the pixel in the second image by using a gradation conversion curve which is decided for a pixel in the first image corresponding to the pixel in the second image using a statistic obtained from the first image, and a final gradation value of the pixel in the second image is calculated by combining the third gradation value and the fourth gradation value.

8. The method of controlling an image processing apparatus according to claim 7, wherein
in the step of correcting the gradation value, the first gradation value is set as a final gradation value for a pixel in a region of the first image at which parallax cannot be detected in the step of detecting; and
the third gradation value is set as a final gradation value for a pixel in a region of the second image at which parallax cannot be detected in the step of detecting.

9. The image processing apparatus according to claim 1, wherein
the correction unit corrects the gradation value of the pixel in the first image and the gradation value of the pixel in the second image corresponding to the pixel in the first image by using the same gradation conversion curve, which the decision unit decided for the pixel in the first image.

10. The method of controlling an image processing apparatus according to claim 5, wherein
in the step of correcting the gradation value the gradation value of the pixel in the first image and the gradation value of the pixel in the second image corresponding to the pixel in the first image are corrected by using the same gradation conversion curve, which is decided for the pixel in the first image in the step of deciding.

11. The image processing apparatus according to claim 1, wherein
the statistic of the pixel value acquired by the acquisition unit is a brightness histogram corresponding to the respective divided region.

12. The method of controlling an image processing apparatus according to claim 5, wherein
the statistic of the pixel value acquired by the acquisition unit is a brightness histogram corresponding to the respective divided region.

* * * * *